(12) United States Patent
Sadowski et al.

(10) Patent No.: US 9,308,599 B2
(45) Date of Patent: Apr. 12, 2016

(54) WELDING GUN WITH DEBRIS REMOVAL AND MOTOR COOLING

(71) Applicant: Lincoln Global, Inc., City of Industry, CA (US)

(72) Inventors: Grant Sadowski, Painesville, OH (US); Jeff Kachline, Highland Heights, OH (US); Wayne Gregg, Cleveland, OH (US); Brian Meess, Willoughby, OH (US); Ed Enyedy, Eastlake, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 476 days.

(21) Appl. No.: 13/832,168

(22) Filed: Mar. 15, 2013

(65) Prior Publication Data

US 2014/0263252 A1    Sep. 18, 2014

(51) Int. Cl.
*B23K 9/26* (2006.01)
*B23K 9/133* (2006.01)

(52) U.S. Cl.
CPC ............... *B23K 9/26* (2013.01); *B23K 9/1336* (2013.01)

(58) Field of Classification Search
CPC ............ B23K 9/26; B23K 9/28; B23K 9/173; B23K 9/285; B23K 9/295
USPC .............. 219/137.42, 137.44, 137.61, 137.62
See application file for complete search history.

(56) References Cited

U.S. PATENT DOCUMENTS

| 2,756,310 | A | 4/1953 | Galbraith |
|---|---|---|---|
| 3,389,844 | A | 6/1968 | Rossner |
| 3,738,555 | A | 6/1973 | Karnes et al. |
| 3,783,233 | A | 1/1974 | Molin |
| 3,798,410 | A | 3/1974 | Dinse |
| 3,980,860 | A | 9/1976 | Howell et al. |
| 4,057,705 | A | 11/1977 | Cockrum et al. |
| 4,529,863 | A * | 7/1985 | Lebel ..................... B23K 9/173 219/137.2 |
| 4,861,962 | A | 8/1989 | Sanders et al. |
| 5,045,667 | A | 9/1991 | Iceland et al. |
| 5,635,091 | A | 6/1997 | Hori et al. |
| 5,760,373 | A | 6/1998 | Colling |
| 6,005,221 | A | 12/1999 | Cusick |
| 6,225,599 | B1 | 5/2001 | Altekruse |
| 6,307,179 | B1 | 10/2001 | Walters |
| 6,710,300 | B2 | 3/2004 | Steenis et al. |
| 6,744,013 | B2 | 6/2004 | Jones |

(Continued)

FOREIGN PATENT DOCUMENTS

JP           56-142880          3/1955

*Primary Examiner* — Brian Jennison
(74) *Attorney, Agent, or Firm* — Pearne & Gordon LLP

(57) ABSTRACT

A welding gun includes a handle portion comprising a motor configured to move electrode wire through the welding gun. A diffuser comprises an interior chamber and a plurality of openings defining exit passages from the interior chamber to an exterior of the diffuser. A barrel is located between the diffuser and the handle portion and supplies to the diffuser from the handle portion. A contact tip extends from the diffuser and comprises a front portion, a rear portion, and a contact tip bore extending therethrough configured to receive the electrode wire. A diffuser insert is disposed within the interior chamber of the diffuser, including an insert bore extending therethrough configured to receive electrode wire, and an outer surface configured to direct debris from within the interior chamber of the diffuser towards exit passages to discharge the debris. The handle portion is configured to direct a flow of the shielding gas over the motor to cool the motor.

24 Claims, 6 Drawing Sheets

(56) References Cited

U.S. PATENT DOCUMENTS

| | | |
|---|---|---|
| 6,924,461 B2 | 8/2005 | Matiash |
| 7,067,768 B2 | 6/2006 | Miwa et al. |
| 7,271,366 B2 | 9/2007 | Kensrue |
| 7,544,913 B2 | 6/2009 | Helenius et al. |
| 7,576,300 B2 | 8/2009 | Giese |
| 7,723,644 B2 | 5/2010 | Christopher et al. |
| 8,106,327 B2 | 1/2012 | Scaini et al. |
| 8,338,753 B2 | 12/2012 | Kachline |
| 2005/0134125 A1 | 6/2005 | Kim |
| 2005/0218132 A1 | 10/2005 | Wells |
| 2011/0198332 A1 | 8/2011 | Cenko |
| 2012/0211479 A1 | 8/2012 | Anderson |

* cited by examiner

WELDING GUN WITH DEBRIS REMOVAL AND MOTOR COOLING

CROSS-REFERENCE TO RELATED APPLICATIONS

Not applicable.

FIELD OF THE INVENTION

The present application relates generally to the field of gas metal arc welding (GMAW) or metal inert gas (MIG) welding, and more particularly, to a diffuser and contact tip assembly for use in such welding.

BACKGROUND OF THE INVENTION

A GMAW or MIG welding torch allows a user or robot to direct an electrode metal wire and welding current toward a target work piece. The electrode metal wire is continuously fed from a spool and consumed as the welding process progresses. Components of a GMAW or MIG welding torch include consumables such as a contact tip, a nozzle, and a diffuser. The electrode metal wire feeds through a passageway in the contact tip. The welding current flows through the diffuser and the contact tip. The inert gas flows from passages in the diffuser, and the nozzle guides the gas towards the tip of the electrode metal wire.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a welding gun is provided. The welding gun comprises a handle portion comprising a motor configured to move electrode wire through the welding gun. A diffuser comprises an interior chamber and a plurality of openings defining exit passages from the interior chamber to an exterior of the diffuser. A barrel is located between the diffuser and the handle portion and connects the diffuser to the handle portion and is configured to supply shielding gas to the diffuser from the handle portion. A contact tip extends from the diffuser and comprises a front portion, a rear portion, and a contact tip bore extending therethrough configured to receive the electrode wire. A diffuser insert is disposed within the diffuser and comprises an insert bore extending through the diffuser and configured to receive the electrode wire, and an outer surface configured to direct debris from within the interior chamber of the diffuser towards the exit passages to thereby discharge the debris to the exterior of the diffuser. The handle portion is configured to direct a flow of the shielding gas over the motor thereby cooling the motor during a welding operation.

In accordance with another aspect of the present invention, a welding gun is provided. The welding gun comprises a handle portion comprising a motor configured to move electrode wire through the welding gun. A diffuser comprises an interior chamber and a plurality of openings defining exit passages from the interior chamber to an exterior of the diffuser. A barrel is located between the diffuser and the handle portion and connects the diffuser to the handle portion and is configured to supply shielding gas to the diffuser from the handle portion. A contact tip extends from the diffuser and comprises a front portion, a rear portion, and a contact tip bore extending therethrough configured to receive electrode wire. The rear portion of the contact tip further comprises an angled outer surface defining a diffuser insert that is configured to direct debris from within the interior chamber of the diffuser towards the exit passages to thereby discharge the debris to the exterior of the diffuser. The handle portion is configured to direct a flow of the shielding gas over the motor thereby cooling the motor during a welding operation.

In accordance with another aspect of the present invention, a welding gun is provided. The welding gun comprises a handle portion comprising a motor configured to move electrode wire through the welding gun. A diffuser comprises an interior chamber and a plurality of openings defining exit passages from the interior chamber to an exterior of the diffuser, the exit passages being utilized as gas passages for shielding gas used during a welding operation. A barrel is located between the diffuser and the handle portion and connects the diffuser to the handle portion and is configured to supply the shielding gas to the diffuser from the handle portion. A contact tip extends from the diffuser and is removably coupled to the diffuser. The contact tip comprises a front portion, a rear portion, and a contact tip bore extending therethrough configured to receive the electrode wire. A diffuser insert is disposed within the interior chamber of the diffuser, and comprises an insert bore extending therethrough with a first end having a diameter substantially similar to a diameter of the electrode wire received within the insert bore, and an outer surface configured to direct debris from within the interior chamber of the diffuser towards the exit passages to thereby discharge the debris to the exterior of the diffuser. The handle portion is configured to direct a flow of the shielding gas over the motor thereby cooling the motor during the welding operation.

In accordance with another aspect of the present invention, a welding diffuser and contact tip assembly for use with a welding apparatus is provided. The assembly comprises a diffuser comprising an interior chamber and a plurality of openings defining exit passages from the interior chamber to an exterior of the diffuser. The diffuser further comprises a diffuser insert formed together with the diffuser as a monolithic element, the diffuser insert comprising an insert bore extending therethrough configured to receive electrode wire, and an angled outer surface configured to direct debris from within the interior chamber of the diffuser towards the exit passages to thereby discharge the debris to an exterior of the diffuser. A contact tip is coupled to the diffuser and comprises a front portion, a rear portion, and a contact tip bore extending therethrough configured to receive electrode wire.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Figure 1:
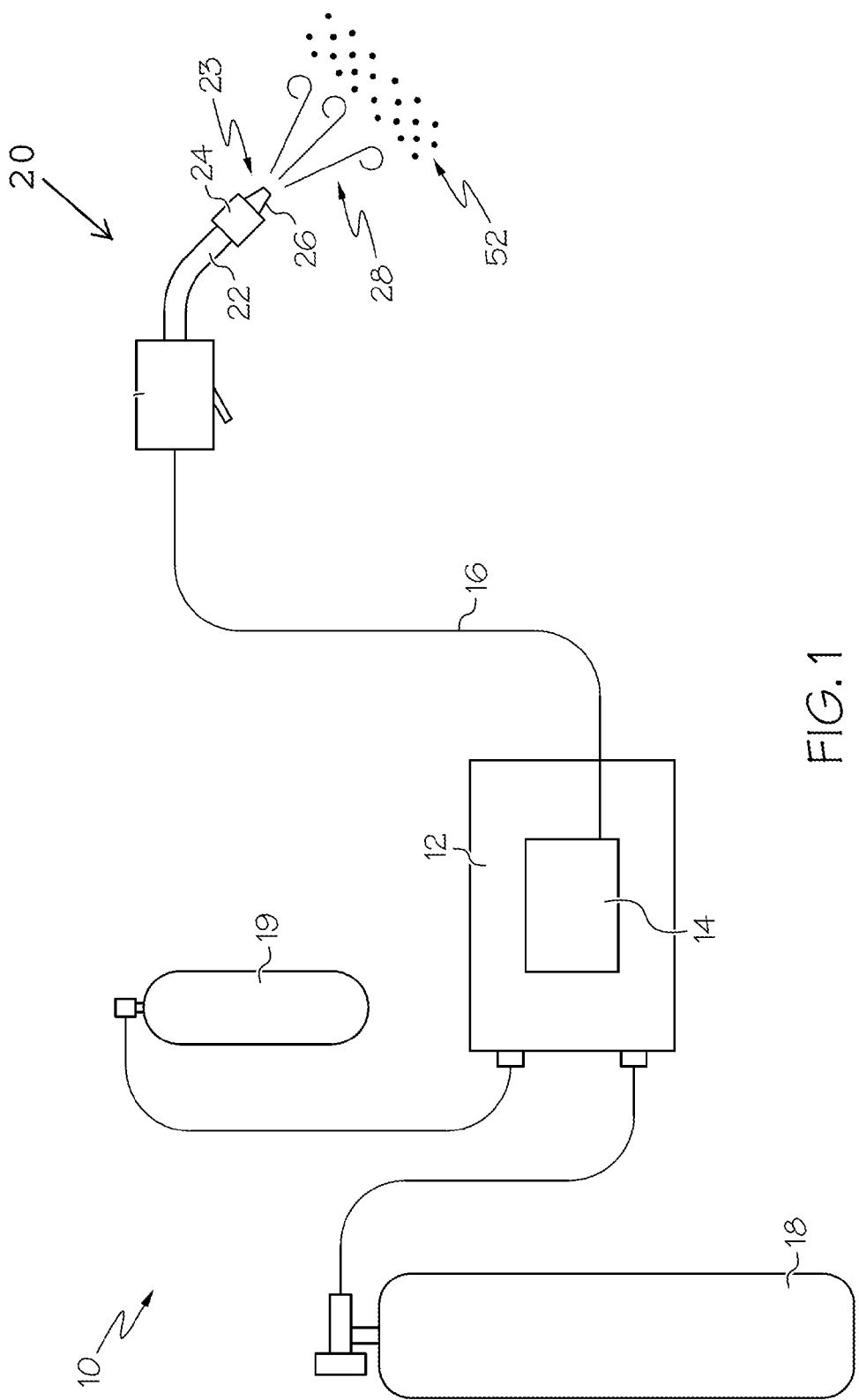
FIG. 1 illustrates a schematic view of one example GMAW or MIG welding apparatus.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Turning to FIG. 1, an example GMAW or MIG welding apparatus 10, such as a welding torch, is illustrated schematically. The welding apparatus 10 generally includes a wire feeder 12 with a source 14 of suitable electrode wire (such as aluminum wire, steel wire, stainless steel wire, etc.) that is transported via a guide hose 16 to a welding gun 20 (such as a semi-automatic welding gun, a "push-pull" gun with a motor to aid in wire feeing, or even a robotic welding gun). Typically, in electric arc welders, a power source passes current between an electrode and a work piece. Often, the electrode is a continuous welding wire drawn from a supply of welding wire, such as a drum or reel, which is passed through a contact tip 26 or gun on its way to being melted and deposited onto the work piece. The gun 20 can be provided with a selectively operable switch for applying welding power from the power source to the electrode (i.e., the wire) for establishing an arc between an exposed portion of the electrode and the work piece. Wire feeders 12 are often used to advance the welding wire, preferably in a consistent and controllable manner, to the welding gun for use in the welding operation. Welding wire feeders can be manufactured in several forms, each optimized for a specific application. Common classifications of wire feeders include robotic wire feeders, portable wire feeders, tractor wire feeders and bench mount wire feeders.

In one conventional welding arrangement, a portable wire feeder 12 is connected to a remotely positioned power source through a power source cable, also known as an electrode cable or wire. The wire feeder 12 is additionally connected to a welding gun by a guide hose. A motorized feeding system in the wire feeder employs rollers to advance or pay welding electrode wire from a source 14 or supply of wire (often a spool of wire) through the guide hose 16 to the welding gun 20. For this purpose, the guide hose 16 can include an internal tube for transporting the wire from the feeder 12 to the gun 20, in addition to electrical wiring for providing power and control circuitry to the gun 20. Optionally, the guide hose 16 can further include passageways for transporting shielding gas to the gun and/or for circulating cooling fluid through or to the gun. A first source of gas 18, which is an inert gas used as the shielding gas during a welding operation, is provided to the wire feeder 12 and is also supplied to the welding gun 20 via the guide hose 16. A second source of gas 19 can optionally be provided to the wire feeder 12 and is also supplied to the welding gun 20 via the guide hose 16.

The welding gun 20 is handled by a user or a robotic arm to conduct the welding operation, and generally includes a barrel or gooseneck 22 that is removably or non-removably coupled to a welding diffuser and contact tip assembly 23. The assembly 23 includes a welding diffuser 24, typically made of brass, coupled to the gooseneck 22, and a contact tip 26, typically made of copper, removably coupled to the welding diffuser 24. While the gooseneck 22 is often removable from the diffuser 24, it is contemplated that the gooseneck 22 and diffuser 24 could be machined as a single part, or even secured together (e.g., brazed together). The welding diffuser 24 is configured to supply the inert gas used as a shielding gas 28 during a welding operation, such as a carbon dioxide and argon blend, although various gasses can be used. The contact tip 26 guides the electrode wire towards the work piece to be welded, and a power lead (not shown) is attached to contact tip 26 to direct the voltage and current between advancing electrode wire and work piece to create the arc for the welding operation.

Figure 2:
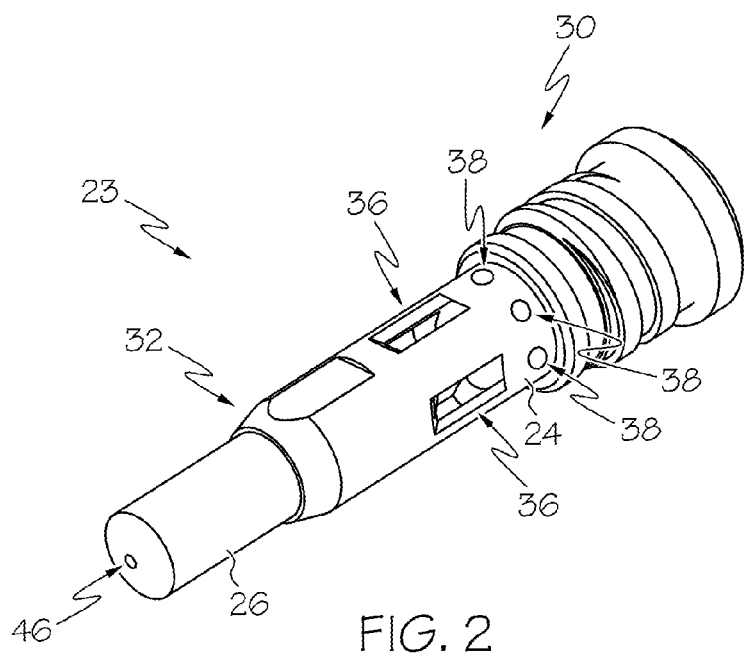
FIG. 2 illustrates a perspective view of a first example welding diffuser and contact tip assembly.
Figure 3:
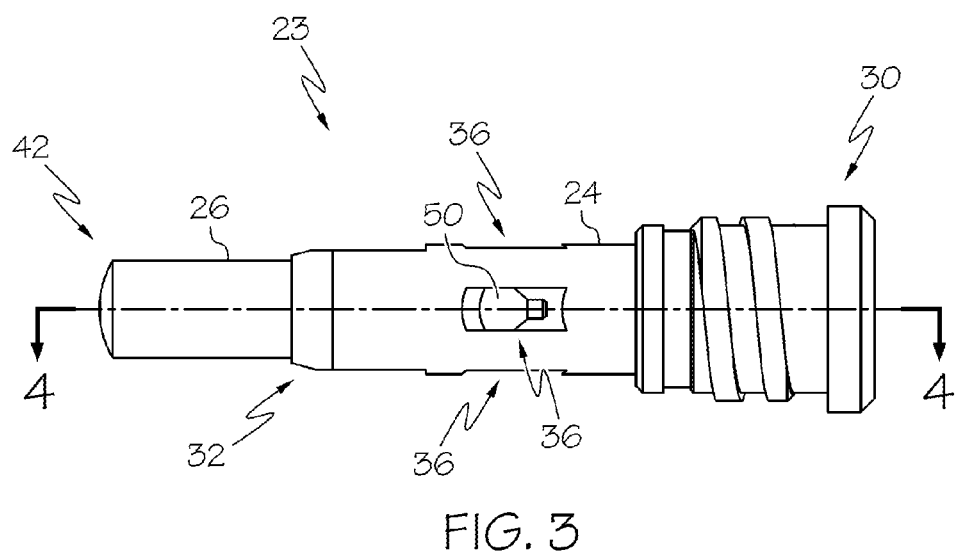
FIG. 3 illustrates a side view of the welding diffuser and contact tip assembly of FIG. 2.
Figure 4A:
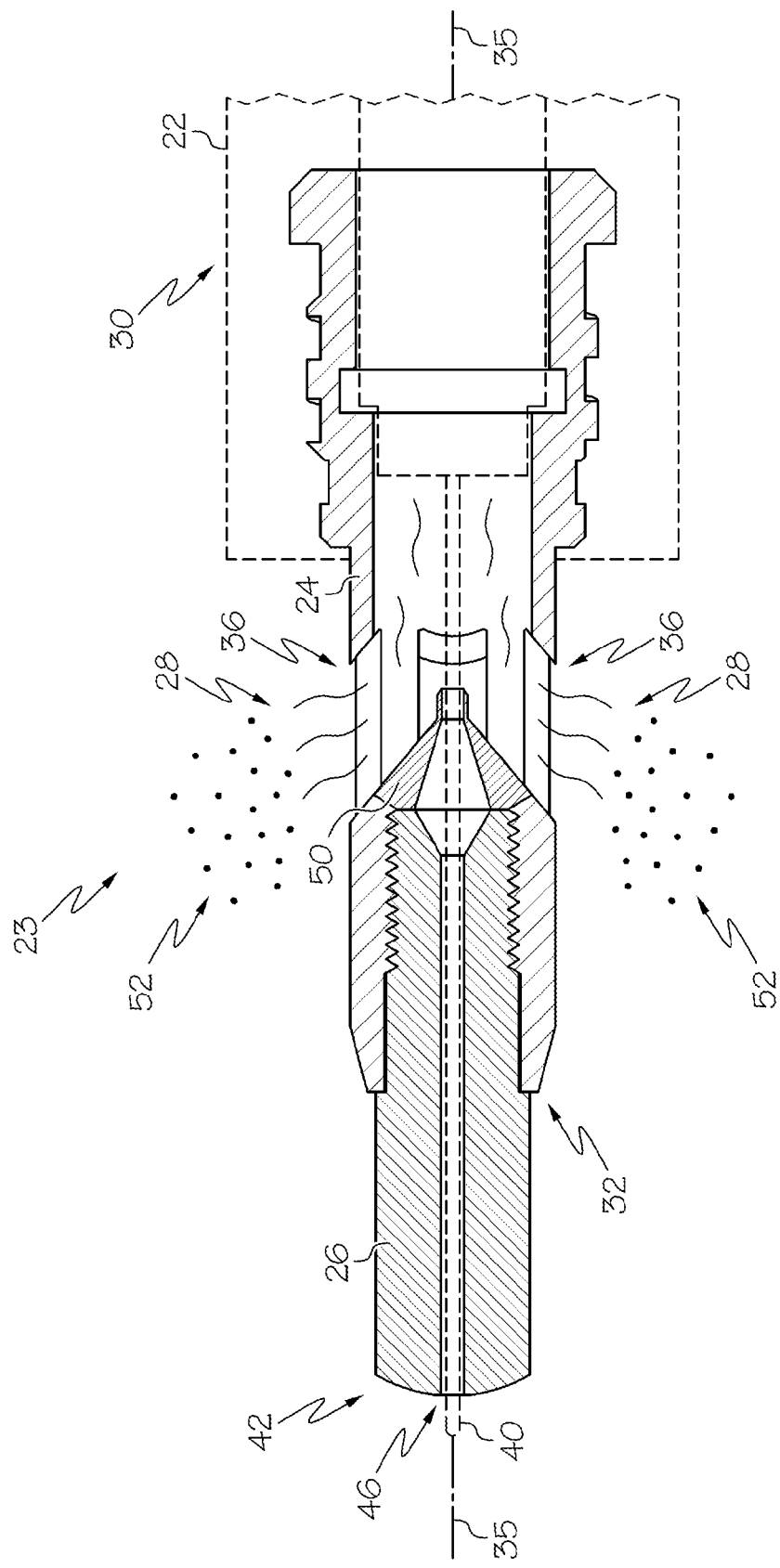
FIG. 4A illustrate a section view of the welding diffuser and contact tip assembly taken along line 4-4 of FIG. 3.

Turning now to FIGS. 2-4, the welding diffuser and contact tip assembly 23 will be described in further detail. The welding diffuser 24 includes a first end 30 configured to be removably coupled to the gooseneck 22 (shown in phantom) of the welding gun 20, such as by a threaded connection or other removable mechanical fastener. The welding diffuser 24 further includes a second end 32 configured to be removably coupled to the contact tip 26 (see FIG. 4A), such as by a threaded connection or other removable mechanical fastener. The first and second ends 30, 32 are located opposite from each other along a longitudinal axis 35.

The welding diffuser 24 also includes an interior chamber 34 that at least partially receives an end of the gooseneck 22 so that the electrode wire 40 and shielding gas 28 can be received therein. A plurality of openings 36 define exit passages from the interior chamber 34 to an exterior of the diffuser 24. In one example, four openings 36 can extend through an outer wall of the diffuser 24 in a generally evenly-spaced arrangement, although more or less numbers of openings 36 can be arranged variously. The exit passages can be utilized as gas passages for the shielding gas 28 used during a welding operation, and/or can be used as debris discharge passages as will be described herein. Still, it is understood that optional openings 38 (see FIG. 2), such as six openings (or more/less), can also be provided as shielding gas discharge holes from the interior chamber 34, while the openings 36 can be used primarily to discharge debris from the interior chamber 34.

The contact tip 26 includes a front portion 42 at a distal end for delivering the electrode wire 40 to the work piece, and a rear portion 44 configured to be removably coupled to the second end 32 of the diffuser 24. The front and rear portions 42, 44 are located opposite from each other along a longitudinal axis (which can be substantially coaxial with the longitudinal axis 35 of the diffuser 24). In one embodiment, the rear portion 44 of the contact tip 26 can be coupled to the second end 32 of the diffuser 24 via threaded connection or other removable mechanical fastener. The rear portion 44 can have a relatively smaller diameter than the front portion 42 with a shoulder therebetween, and can be at least partially received within the second end 32 of the diffuser 24. In this embodiment, the shoulder is a substantially flat surface of annular shape configured substantially at a right angle, although in another embodiment the shoulder can be a frusto-conically shaped surface or even may have other shapes.

The contact tip 26 further includes an internal surface defining a contact tip bore 46 extending therethrough configured to receive the electrode wire 40. The contact tip bore 46 may be located substantially at the center of the contact tip 26 along the longitudinal axis through the front and rear portions 42, 44. The contact tip bore 46 may further be arranged along the longitudinal axis 35 of the diffuser 24.

During a welding operation, the electrode wire 40 (such as aluminum wire) is being fed through the welding diffuser and contact tip assembly 23, and there is the possibility that the electrode wire 40 will have feeding issues in the system due to its low column strength. As the electrode wire 40 is fed through the system, there is friction between various rubbing surfaces that can create debris 52, such as shavings, aluminum chips and the like. The debris 52 can build up in certain areas of the system and cause wire feeding problems.

In order to facilitate the discharge of debris 52 out of the wire feed path, the welding diffuser and contact tip assembly 23 further includes a diffuser insert 50 disposed within the interior chamber 38 of the diffuser 24. In one example, the diffuser insert 50 can be a separate element arranged in an abutting relation with the rear portion 44 of the contact tip 26. The diffuser insert 50 can be removably or non-removably installed within the diffuser 24. In one example, the diffuser insert 50 can be secured to the diffuser within the interior chamber, such as by a press fit, threaded connection, or other mechanical fastening structure. Alternatively, the diffuser insert 50 could be removably coupled to the rear portion 44 of the contact tip 26. Still, in another example as will be discussed later with respect to FIGS. 5-6, the diffuser insert 50 can be formed together with the contact tip 26. In still yet other examples, the diffuser insert 50 could be provided with the diffuser 24 as a monolithic element. For example the diffuser insert 50 could be provided as one or more internal projections or apertures extending into the interior chamber 34 of the diffuser 24. The one or more internal projections or apertures could be formed together with the diffuser 24 as a monolithic element by molding, casting, machining, sintering, etc. Alternatively, the one or more internal projections or apertures could be formed together with the diffuser 24 by way of an independently manufactured insert that is then non-removably secured within the interior chamber 34 of the diffuser 24, such as by welding, adhesives, or the like. While the diffuser insert 50 is generally discussed herein as being a single part, it is contemplated that multiple parts can be used together to effectively provide the diffuser insert 50.

Figure 4B:
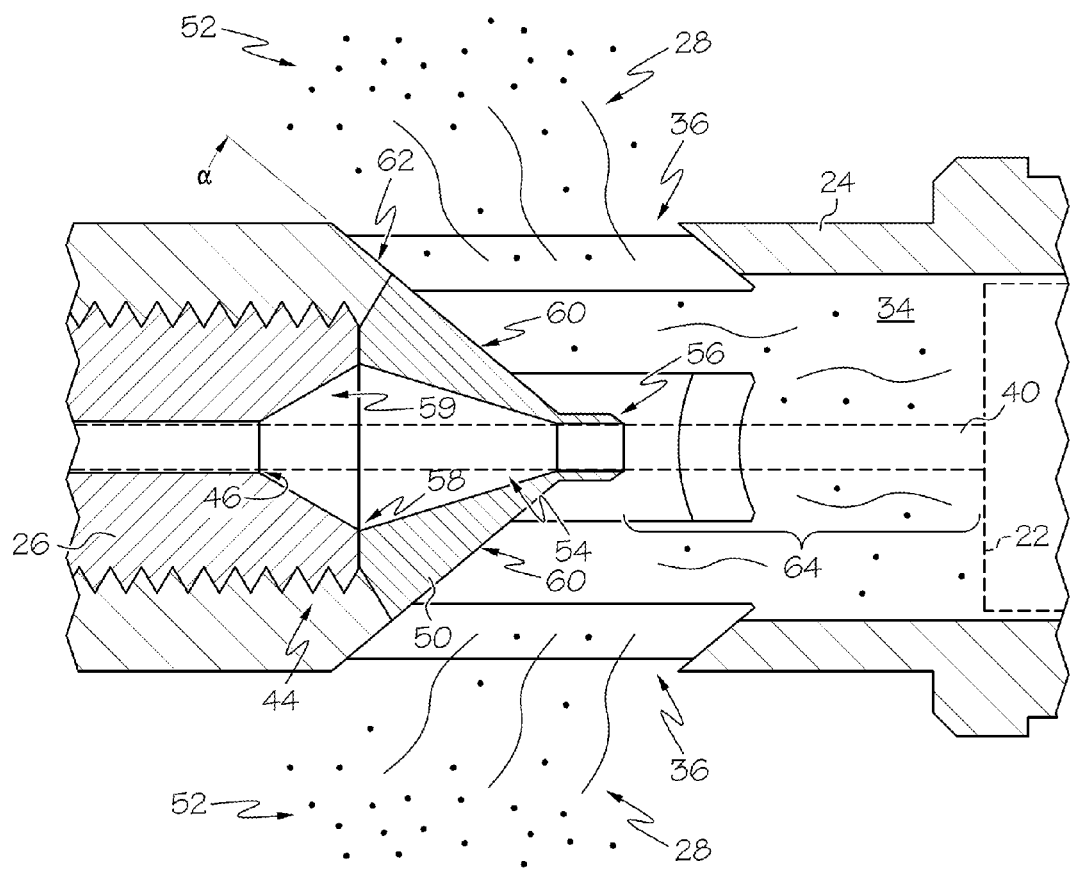
FIG. 4B illustrates a partial detail view of FIG. 4A.

Turning to FIGS. 4A-4B, the diffuser insert 50 includes an insert bore 54 extending therethrough, between a first end 56 and a second end 58, and is configured to receive the electrode wire 40. The insert bore 54 can be located substantially at a center of the diffuser insert 50, and can be substantially coaxial with the contact tip bore 46. Thus, the insert bore 54 can be substantially concentric with the contact tip bore 46 to thereby maintain the concentricity of the electrode wire 40 as it moves through the system. In different examples, the electrode wire 40 can be provided with various outer diameters, such as 0.030", 0.035", 3/64", or 1/16", although other sizes can be utilized. The first end 56 of the insert bore 54 has a diameter substantially similar to a diameter of the electrode wire 40 received within the insert bore 54 to accurately guide the electrode wire 40 through the diffuser 24 and reduce the creation of additional debris. By "substantially similar," it is contemplated that the first end 56 of the insert bore 54 can have an inner diameter that provides a relatively tight tolerance, such as approximately 0.010" greater than the diameter of the electrode wire 40 (other tolerances are contemplated). The first end 56 may further include a chamfered or counterbored geometry to ease the electrode wire 40 into the diffuser insert 50 and reduce the generation of additional debris 52. Additionally, the diffuser insert 50 is preferably made from a material that has less hardness as compared to the material of the electrode wire 40 to inhibit the creation of additional debris (e.g., aluminum chips) as the electrode wire 40 is fed through the diffuser insert 50. In one example, the diffuser insert 50 can be made from a plastic material, although various other materials of less hardness than the electrode wire 40 are also contemplated. In other examples, either or both of the first end 56 and the electrode wire 40 can include a coating or other covering of a material (e.g., plastic, teflon, or the like) that has less hardness as compared to the material of the electrode wire 40 to inhibit the creation of additional debris. In yet another alternative, a tube or the like can be provided inside of the contact tip bore 46 to help reduce friction.

A second end 58 of the insert bore 54 is arranged to substantially line up with the contact tip bore 46 so that the electrode wire 40 can easily be fed through the diffuser insert 50 and then through the contact tip 26. For example, the first and second ends 56, 58 of the insert bore 54 and the contact tip bore 46 can all be substantially coaxial. Optionally, the cross-sectional area of the second end 58 of the insert bore 54 can be relatively larger than the cross-sectional area of the first end 56. For example, the insert bore 54 can include a stepped, or even conical, geometry extending between the first and second ends 56, 58, with the relatively larger cross-sectional area adjacent the rear portion 44 of the contact tip 26. In addition or alternatively, the contact tip 26 can further include an increased cross-sectional area 59 of the contact tip bore 46 immediately adjacent end of the rear portion 44 to facilitate the transfer of electrode wire 40 between the insert bore 54 and the contact tip 26. In one example, the geometry of the contact tip bore 46 immediately adjacent end of the rear portion 44 can be stepped or conical, with the larger cross-sectional area 59 facing the second end 58 of the insert bore 54 such that the two largest cross-sectional areas are immediately adjacent.

Additionally, the insert bore 54 can be configured to aid in the movement of the debris out of the diffuser 24. For example, the insert bore 54 can include an angled outer surface 60 configured to direct debris 52 from within the interior chamber 34 of the diffuser 24 away from the electrode wire 40 and first end 56 of the insert bore 54, and towards the exit passages to thereby discharge the debris 52 to the exterior of the diffuser 24. As shown in FIG. 4B, as the shielding gas 28 and debris 52 move through the interior chamber 34 of the diffuser 24, the angled outer surface 60 directs the debris 52 away from the wire feed path and outwards towards the openings 36 to be discharged to the external environment. As a result, less debris 52 enters the first end 56 of the diffuser insert 50, or collects inside the interior chamber 34 of the diffuser 24.

The angled outer surface 60 of the diffuser insert 50 can have various geometries or surface features to direct the debris 52 and/or shielding gas 28 towards the openings 36. In one example, the angled outer surface 60 of the diffuser insert 50 can have a generally conical geometry. The conical geometry can be substantially continuous around the angled outer surface 60 of the diffuser insert 50, such as symmetrical around the longitudinal axis 35. Alternatively, the conical geometry can even include discontinuities, such as to fit the diffuser insert 50 into the interior chamber 34 and/or to direct the shielding gas 28 and debris 52 towards the exit passages. Additionally, while the first end 56 of the diffuser insert 50 is shown to project out a distance away from the angled outer surface 60, it is understood that the first end 56 may be flush with the angled outer surface 60.

Together with the diffuser insert 50, the plurality of openings 36 of the diffuser 24 are configured to facilitate the discharge of debris 52. For example, the plurality of openings 36 can be provided as a series of milled slots arranged around the circumference of the diffuser 24. The openings 36 can have various geometries, such as square, circular, rectangular, oval, polygonal, etc. In one example, the openings 36 can have an elongated shape that extends in a longitudinal direction to facilitate the discharge of the shielding gas 28 and debris 52. The internal geometry of the slotted openings 36 can be configured direct the debris 52 (e.g., shavings and aluminum chips) outwards to the exterior environment. As shown in FIG. 4B, at least one of the exit passages 36 can be arranged at an angle α with respect to portions of the diffuser 24, such as the longitudinal axis 35. For example, one or more ends 62 of the opening 36 can be provided at the angle α. It is contemplated that some or all of the exit passages 36 can be arranged at a similar angle α. Various angles are contemplated, such as approximately 40 degrees relative to the longitudinal axis 35, although the angle can be greater or lesser.

The angle α of the exit passages 36 can be adjusted based on a desired flow direction of the shielding gas, such as to direct the shielding gas 28 towards different portions of the welding work piece, and/or to increase, decrease, or direct the discharge or purging of debris 52 from the diffuser 24 by the shielding gas. Additionally, the geometry of the diffuser insert 50 can be configured to work together with the exit passages 36 to facilitate the desired flow direction of the shielding gas 28 and/or discharge of debris 52. In one example, the angled outer surface 60 of the diffuser insert 50 can be configured to substantially match the angle α of at least one exit passage 36. Thus, for example, if the angle α of at least one exit passage 36 is about 40 degrees, the angle of the outer surface 60 of the diffuser insert 50 can similarly be about 40 degrees. If all of the slotted openings 36 are angled at approximately the same angle α, then it can be beneficial to have a substantially matching conical geometry of the angled outer surface 60. In addition or alternatively, as shown in FIG. 4B, it can be beneficial to arrange the angled outer surface 60 of the slotted openings 36 to match closely with the angle α of the exit passages 36, such as the angle of the end 62 of the exit passages 36. In one example, it can be beneficial to arrange the angled outer surface 60 to be substantially continuous with the angle of the end 62 of the exit passages 36 so as to provide a continuous and less restricted exit path for the debris 52 to thereby reduce, such as minimize, the build-up of debris 52 within the interior chamber 34. As a result, wire feeding problems can be reduced. In certain embodiments, it is contemplated that the plurality of openings 36 can be configured to manipulate a flow of the shielding gas 28 from within the interior chamber 34 of the diffuser 24 and out of the exit passages 36 to thereby direct the flow of shielding gas about a molten welding puddle formed during a welding operation, and that the plurality of openings can be used with or without the diffuser insert.

Additionally, as shown in FIG. 4B, a spacing gap 64 is provided between the end of the gooseneck 22 within the interior chamber 34 and the first end 56 of the diffuser insert 50. The spacing gap 64 is used to provide a pathway for the debris 52 to exit via the openings 36. For example, the length of electrode wire 40 that is exposed along the spacing gap 64 encounters the flow of shielding gas 28 (or even a purge gas), which helps to disengage the shavings, chips, etc. from the electrode wire 40 and facilitates the discharge of debris 52. In addition or alternatively, as shown in FIGS. 3 and 4B, it can be beneficial to arrange the first end 56 of the diffuser insert 50 to be at least partially exposed over the linear extent of the exit passages 36, such that possible debris 52 generated by the entry of the electrode wire 40 entering the first end 56 of the diffuser insert 50 can also be discharged to an exterior environment.

In addition to the diffuser insert 50 using the exiting flow of shielding gas 28 to discharge the debris 52 out of the openings 36, it is further contemplated that a secondary gas flow could also be utilized. Use of a secondary gas may be beneficial where the shielding gas 28 is expensive or has other performance considerations. For example, the secondary gas could include compressed air (e.g., shop air). As such, turning briefly to FIG. 1, the diffuser 24 can be configured for use with a welding gun 20 that comprises a first source of gas 18 used as shielding gas 28 during a welding operation, and a second source of gas 19 used as a purge gas to remove debris 52 from within the interior chamber 34 of the diffuser 24 to an exterior of the diffuser 24. In use, the shielding gas 28 can facilitate the discharge of debris 52 during a typical welding operation. Once the welding operation is finished, the user can then switch over to the second source of gas 19 to purge the system and welding gun 20 of debris 52. Preferably, the second source of gas 19 is used independently, although it is contemplated that it could be used in combination with the first source of gas 18. Further, operation of the second source of gas 19 can be done with or without a wire-feeding operation. Because the second source of gas 19 is less expensive, the user can spend extra time to clean out the system, and/or can use a greater pressure or gas flow rate than used for a welding operation.

Figure 5:
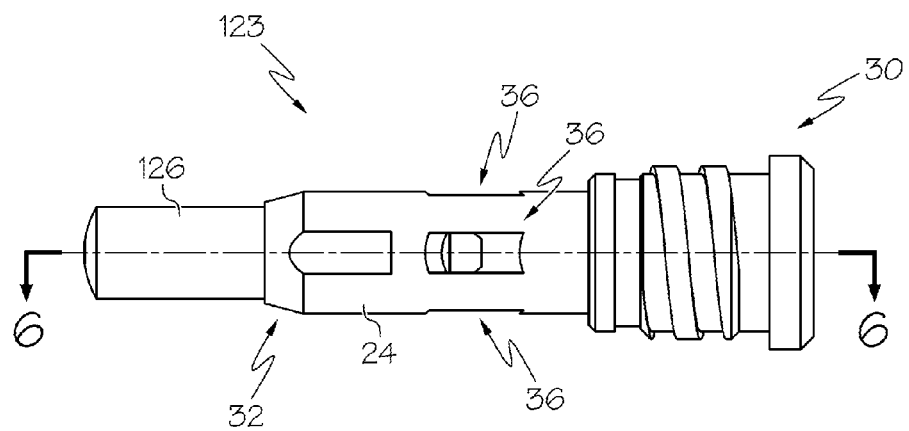
FIG. 5 illustrates a side view of a second example welding diffuser and contact tip assembly.
Figure 6:
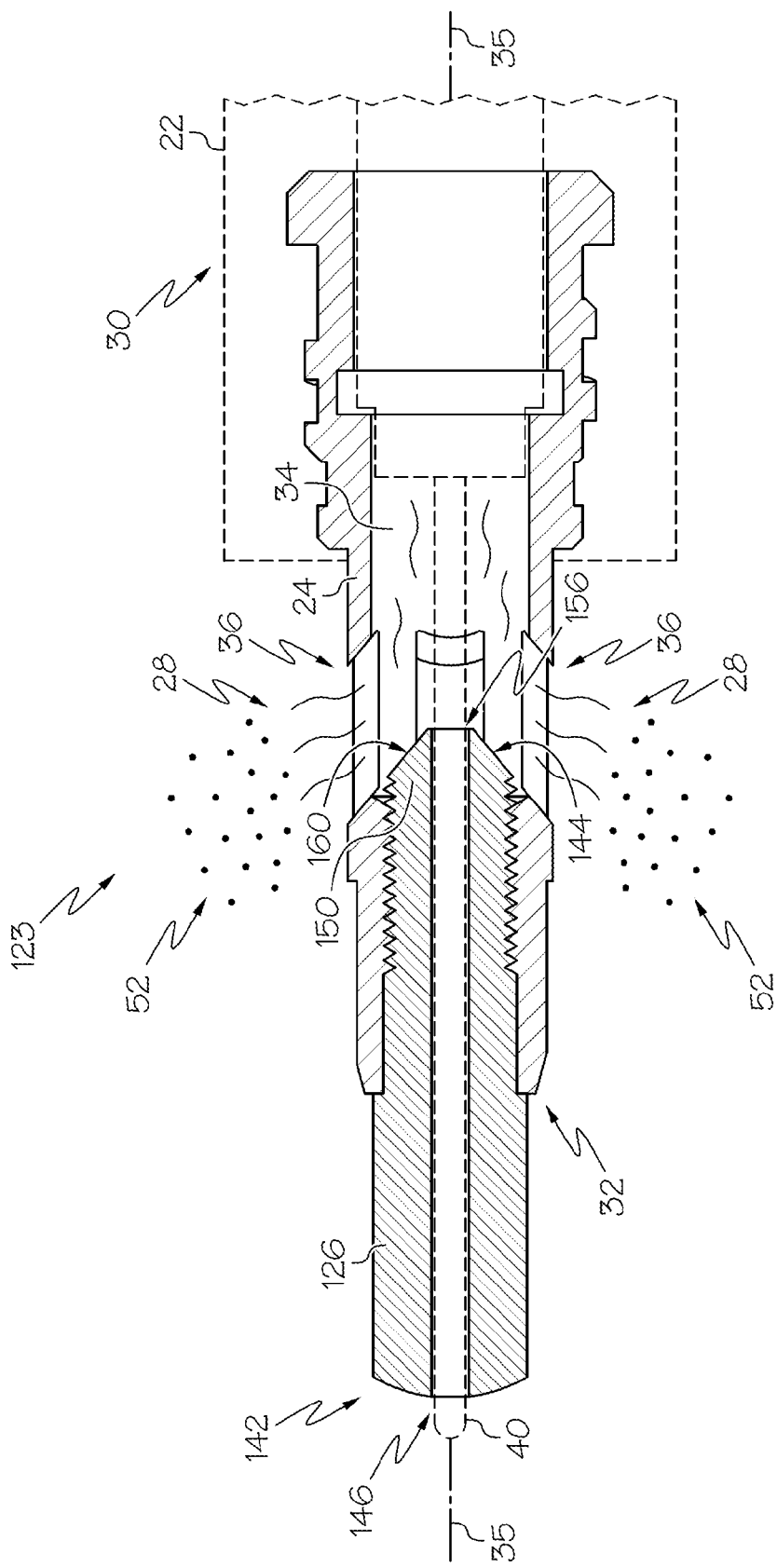
FIG. 6 illustrates a section view of the welding diffuser and contact tip assembly taken along line 6-6 of FIG. 5.

Turning now to FIGS. 5-6, a second example welding diffuser and contact tip assembly 123 is illustrated in which the diffuser insert 150 is integrated into the contact tip geometry. In one example, the diffuser insert 150 can be formed together with the contact tip 126, such as in a monolithic element. It is understood that any of the features previously discussed herein can apply similarly to the embodiment shown in FIGS. 5-6. For clarity, similar or identical parts are illustrated with the same reference numbers as in the previous figures. However, new or different parts are illustrated using a "100"-series reference number.

For example, the diffuser insert 150 can be manufactured, such as milled, from the same body as the contact tip 126. Thus, the contact tip 126 can have a tapered end that provides the diffuser insert 150 that is coupled to or removed from the diffuser 24 together with the contact tip 126, such as by a threaded connection or the like. Such a construction can avoid the need for a separate additional part, and simplifies assembly.

In one example, the rear portion 144 of the contact tip 126 can include an angled outer surface 160 defining a diffuser insert 150 that is configured to direct debris 52 from within the interior chamber 34 of the diffuser towards the exit passages 36 to thereby discharge the debris 52 to an exterior of the diffuser 24. The angled outer surface 160 can be similar to the angled outer surface 60 described previously, or can even be different. For example, the angled outer surface 160 can have a generally conical geometry that can be substantially continuous around the angled outer surface 160 of the diffuser insert 150, such as symmetrical around the longitudinal axis 35. Alternatively, the conical geometry can even include discontinuities to fit the diffuser insert 150 into the interior chamber 34 or to direct the shielding gas 28 and debris 52 towards the exit passages. Additionally, while the first end 156 of the diffuser insert 150 is shown to be flush with the angled outer surface 160, it may also project out a distance away as shown in FIG. 4A.

Conventionally, a contact tip 126 is manufactured from a copper material or the like to increase electrical conductivity, although this typically has a hardness that is greater than that of the aluminum electrode wire 40. Thus, the diffuser insert 150 can include various features to reduce generating additional debris 52 when the electrode wire 40 enters the first end 156 of the diffuser insert 150. In one example, the first end 156 of the diffuser insert 150 can be chamfered or counter-bored to ease the entry of electrode wire 40 into the diffuser insert 150. In addition or alternatively, the first end 156 can include a coating or other covering of a material (e.g., plastic, teflon, or the like) that has less hardness as compared to the material of the electrode wire 40 to inhibit the creation of additional debris (e.g., aluminum chips) as the electrode wire 40 is fed therethrough. In another alternative, the electrode wire 40 can include a coating or other covering (e.g., plastic, teflon, or the like) to inhibit the creation of additional debris. In yet another alternative, a tube or the like can be provided inside of the contact tip bore 146 to help reduce friction. Additionally, a spacing gap (similar to gap 64 shown in FIG. 4B) can be provided between the end of the gooseneck 22 within the interior chamber 34 and the first end 156 of the diffuser insert 150 to provide a pathway for the debris 52 to exit via the openings 36. In addition or alternatively, it can be beneficial to arrange the first end 156 of the diffuser insert 150 to be at least partially exposed over the linear extent of the exit passages 36 (similar to FIG. 4B), such that possible debris 52 generated by the entry of the electrode wire 40 entering the first end 156 of the diffuser insert 150 can also be discharged to an exterior environment. Finally, the diffuser insert 150 can be used together with the shielding gas 28 or even a secondary purge gas as described previously herein.

Figure 7:
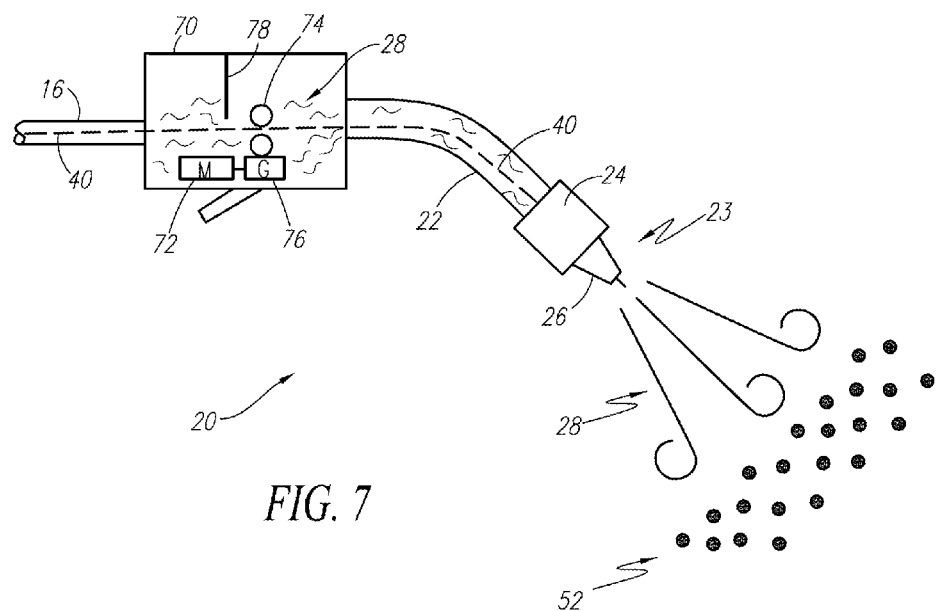
FIG. 7 illustrates a schematic view of an example welding gun.

Turning to FIG. 7, an example welding gun 20 is illustrated schematically. The welding gun 20 includes a handle portion 70. The handle portion 70 is gripped by a welding operator during manual welding. Alternatively, the handle portion 70 can be attached to a robotic arm for automated welding. The guide hose 16 is attached to the handle portion 70. The guide hose 16 supplies the electrode wire 40 to the handle portion and also supplies the shielding gas 28 to the handle portion. The shielding gas 28 and electrode wire 40 pass through the handle portion 70 and into the barrel or gooseneck 22. The handle portion 70 can be sealed to prevent the shielding gas 28 from leaking, so that substantially all of the shielding gas delivered to the handle portion flows to the barrel or gooseneck 22. The shielding gas 28 and electrode wire 40 are conducted to the diffuser 24 via the barrel or gooseneck 22. The electrode wire 40 is fed through the contact tip 26 as described above.

The handle portion 70 can provide a "push-pull" gun that aids in feeding the electrode wire 40 through the contact tip 26. The handle portion can include a motor 72 configured to move the electrode wire 40 through the welding gun 20. For example, the motor 72 can be coupled to drive rollers 74 through a gearbox 76 as shown in FIG. 7. The electrode wire 40 passes through the drive rollers 74, which are driven by the motor 72 via the gearbox 74, and the drive rollers 74 help to pull the electrode wire 70 through the welding gun 20. The motor 72 assists the wire feeder 12 (see FIG. 1) in a push-pull arrangement to advance or move the welding wire through the welding gun 20. The welding apparatus can control the speed of the motor 72 and the wire feeder 12 to control the feed speed of the welding electrode 40. Thus, the motor 72 and the wire feeder 12 can be operated in a coordinated manner. Example types of motors for use in the welding gun 20 include DC motors, servo motors, and other types of motors (e.g., variable speed AC motors).

The motor 72 generates heat as it operates, and during welding and the handle portion 70 can be further heated by the welding arc. The flow of shielding gas 28 within the handle portion 70 removes heat from the handle portion as the flow passes through to the barrel or gooseneck 22. The handle portion 70 is configured to direct the flow of the shielding gas 28 over and around the motor 72, thereby cooling the motor during the welding operation. This can be accomplished by locating the motor within the flow path of the shielding gas 28, such as between a connection to the guide hose 16 and a connection to the barrel or gooseneck 22. The handle portion 70 can also include flow diverters, such as a baffle 78, to direct the flow of shielding gas 28 over the motor 72.

As described above, the flow of shielding gas 28 out of the diffuser 24, in combination with the diffuser insert, can purge debris 52 from the diffuser. Thus, in certain embodiments, the flow of shielding gas 28 both cools the motor 72 in the handle portion 70 and purges debris from the diffuser 24.

Figure 8:
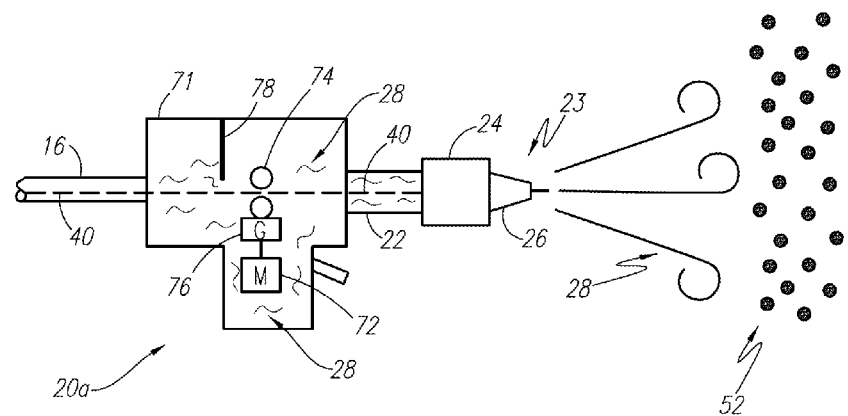
FIG. 8 illustrates a schematic view of an example welding gun.

Turning to FIG. 8, an example welding gun 20a is illustrated schematically. The welding gun 20a in FIG. 8 is similar to the welding gun 20 shown in FIG. 7. However, in FIG. 8, the handle portion 71 has a pistol shape, and the barrel or gooseneck 22 is substantially straight rather than curved. The pistol shape of the handle portion can allow the motor 72, gearbox 76 and drive rollers 74 to be arranged linearly, as shown FIG. 8. The pistol-shaped handle portion 71 can be configured to direct the flow of shielding gas 28 over the motor 72 to cool the motor as described above.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A welding gun comprising:
    a handle portion comprising a motor configured to move electrode wire through the welding gun;
    a diffuser comprising an interior chamber and a plurality of openings defining exit passages from the interior chamber to an exterior of the diffuser;
    a barrel located between the diffuser and the handle portion and connecting the diffuser to the handle portion and configured to supply shielding gas to the diffuser from the handle portion;
    a contact tip extending from the diffuser, comprising a front portion, a rear portion, and a contact tip bore extending therethrough configured to receive the electrode wire; and
    a diffuser insert disposed within the diffuser, comprising an insert bore extending through the diffuser insert and configured to receive the electrode wire, and an outer surface configured to direct debris from within the interior chamber of the diffuser towards the exit passages to thereby discharge the debris to the exterior of the diffuser,
    wherein the handle portion is configured to direct a flow of the shielding gas over the motor thereby cooling the motor during a welding operation.

2. The welding gun of claim 1, wherein the diffuser insert is arranged in an abutting relation with the rear portion of the contact tip.

3. The welding gun of claim 1, wherein the diffuser insert is secured to the diffuser within the interior chamber.

4. The welding gun of claim 1, wherein the flow of the shielding gas both cools the motor and purges the debris from the diffuser.

5. The welding gun of claim 4, wherein the handle portion further comprises a baffle for directing the flow of the shielding gas over the motor.

6. The welding gun of claim 1, wherein the outer surface of the diffuser insert is an angled outer surface configured to direct the debris from within the interior chamber of the diffuser towards the exit passages.

7. The welding gun of claim 6, wherein at least one of the exit passages is arranged at an angle with respect to a longitudinal axis of the diffuser, and wherein the angled outer surface of the diffuser insert is configured to substantially match the angle of said at least one exit passage.

8. The welding gun of claim 6, wherein the angled outer surface of the diffuser insert comprises a conical geometry.

9. The assembly of claim 1, wherein the insert bore comprises a conical geometry with a relatively larger cross-sectional area adjacent the contact tip.

10. The welding gun of claim 1, wherein the diffuser insert is formed together with the contact tip as a monolithic element.

11. The welding gun of claim 1, wherein the plurality of openings of the diffuser further comprise gas passages for the shielding gas used during the welding operation.

12. The welding gun of claim 1, wherein the wherein the diffuser insert is formed together with the diffuser as a monolithic element.

13. A welding gun comprising:
a handle portion comprising a motor configured to move electrode wire through the welding gun;
a diffuser comprising an interior chamber and a plurality of openings defining exit passages from the interior chamber to an exterior of the diffuser;
a barrel located between the diffuser and the handle portion and connecting the diffuser to the handle portion and configured to supply shielding gas to the diffuser from the handle portion; and
a contact tip extending from the diffuser, comprising a front portion, a rear portion, and a contact tip bore extending therethrough configured to receive electrode wire, the rear portion of the contact tip further comprising an angled outer surface defining a diffuser insert that is configured to direct debris from within the interior chamber of the diffuser towards the exit passages to thereby discharge the debris to the exterior of the diffuser,
wherein the handle portion is configured to direct a flow of the shielding gas over the motor thereby cooling the motor during a welding operation.

14. The welding gun of claim 13, wherein the flow of the shielding gas both cools the motor and purges the debris from the diffuser.

15. The welding gun of claim 14, wherein the handle portion further comprises a baffle for directing the flow of the shielding gas over the motor.

16. The welding gun of claim 13, wherein at least one of the exit passages is arranged at an angle with respect to a longitudinal axis of the diffuser, and wherein the angled outer surface of the rear portion of the contact tip is configured to substantially match the angle of said at least one exit passage.

17. A welding gun comprising:
a handle portion comprising a motor configured to move electrode wire through the welding gun;
a diffuser comprising an interior chamber and a plurality of openings defining exit passages from the interior chamber to an exterior of the diffuser, the exit passages being utilized as gas passages for shielding gas used during a welding operation;
a barrel located between the diffuser and the handle portion and connecting the diffuser to the handle portion and configured to supply the shielding gas to the diffuser from the handle portion;
a contact tip extending from the diffuser and removably coupled to the diffuser, the contact tip comprising a front portion, a rear portion, and a contact tip bore extending therethrough configured to receive the electrode wire; and
a diffuser insert disposed within the interior chamber of the diffuser, comprising an insert bore extending therethrough with a first end having a diameter substantially similar to a diameter of the electrode wire received within the insert bore, and an outer surface configured to direct debris from within the interior chamber of the diffuser towards the exit passages to thereby discharge the debris to the exterior of the diffuser,
wherein the handle portion is configured to direct a flow of the shielding gas over the motor thereby cooling the motor during the welding operation.

18. The welding gun of claim 17, wherein the outer surface of the diffuser insert is angled to direct the debris from within the interior chamber of the diffuser towards the exit passages, and wherein the diffuser insert is arranged in an abutting relation with the rear portion of the contact tip.

19. The welding gun of claim 17, wherein the outer surface of the diffuser insert is angled to direct the debris from within the interior chamber of the diffuser towards the exit passages, and wherein the diffuser insert is formed together with the contact tip as a monolithic element.

20. The welding gun of claim 17, wherein the outer surface of the diffuser insert is an angled outer surface configured to direct the debris from within the interior chamber of the diffuser towards the exit passages, wherein at least one of the exit passages is arranged at an angle with respect to a longitudinal axis of the diffuser, and wherein the angled outer surface of the diffuser insert is configured to substantially match the angle of said at least one exit passage.

21. The welding gun of claim 17, wherein the flow of the shielding gas both cools the motor and purges the debris from the diffuser.

22. A welding diffuser and diffuser insert assembly for use with a welding apparatus, the assembly comprising:
a diffuser comprising an interior chamber and a plurality of openings defining exit passages from the interior chamber to an exterior of the diffuser, the diffuser further comprising a diffuser insert, the diffuser insert comprising an insert bore extending therethrough configured to receive electrode wire, and an angled outer surface configured to direct debris from within the interior chamber of the diffuser towards the exit passages to thereby discharge the debris to an exterior of the diffuser;
wherein an angle of the exit passages with respect to a longitudinal axis of the diffuser substantially matches the angled outer surface of the diffuser insert.

23. The welding diffuser and diffuser insert assembly of claim 22, wherein the assembly is a part of a welding gun comprising a handle portion including a motor configured to move electrode wire through the welding gun;

a barrel located between the diffuser and the handle portion and connecting the diffuser to the handle portion and configured to supply shielding gas to the diffuser from the handle portion, wherein the handle portion is configured to direct a flow of the shielding gas over the motor during a welding operation, and wherein the flow of the shielding gas purges the debris from the diffuser.

24. The welding diffuser and diffuser insert assembly of claim 22, wherein the angled outer surface of the diffuser insert extends axially within the interior chamber of the diffuser along the plurality of exit passages, such that the diffuser insert is at least partially exposed at the plurality of exit passages.

\* \* \* \* \*